United States Patent [19]

Rohrlach et al.

[11] Patent Number: 5,082,609
[45] Date of Patent: Jan. 21, 1992

[54] METHOD OF FORMING A MOULDED PANEL

[75] Inventors: Milo L. Rohrlach, North Brighton; William J. Hall, Eden Hills, both of Australia

[73] Assignee: Bridgestone Australia Ltd., Eadwardstown, Australia

[21] Appl. No.: 602,421

[22] Filed: Oct. 22, 1990

[51] Int. Cl.⁵ .................. B29C 67/22; B29C 41/08
[52] U.S. Cl. .................. 264/46.4; 264/255; 264/257; 264/309; 264/338; 156/196
[58] Field of Search .......... 264/338, 255, 257, 309, 264/45.1, 46.4, 46.6, 139; 156/196

[56] References Cited

U.S. PATENT DOCUMENTS

| | | | |
|---|---|---|---|
| 2,217,137 | 10/1940 | Roth et al. | 264/46.4 |
| 3,872,199 | 3/1975 | Ottinger | 264/46.4 |
| 3,879,240 | 4/1975 | Wall . | |
| 4,214,788 | 7/1980 | Srock . | |
| 4,268,557 | 5/1981 | Bracesco . | |
| 4,323,406 | 4/1982 | Morello | 264/46.4 |
| 4,381,908 | 5/1983 | Roth . | |
| 4,420,447 | 12/1983 | Nakashima | 264/46.4 |
| 4,435,349 | 3/1984 | Dominquez et al. | 264/257 |
| 4,455,340 | 6/1984 | Okina | 264/46.6 |
| 4,474,635 | 10/1984 | Adams . | |
| 4,525,231 | 6/1985 | Wnuk . | |
| 4,544,126 | 10/1985 | Melchert . | |
| 4,610,835 | 9/1986 | Ghavamikia | 264/255 |
| 4,614,633 | 1/1986 | Steinbach et al. | 264/338 |
| 4,714,575 | 12/1987 | Preston | 264/46.4 |
| 4,766,025 | 8/1988 | Sanok et al. . | |
| 4,810,452 | 3/1989 | Taillefert et al. | 264/46.4 |
| 4,863,654 | 9/1989 | Belleville et al. | 264/468 X |
| 4,952,351 | 8/1990 | Parker et al. | 264/46.4 |

FOREIGN PATENT DOCUMENTS

| | | | |
|---|---|---|---|
| 0137125 | 4/1985 | European Pat. Off. | 264/46.4 |
| 265313 | 4/1988 | European Pat. Off. . | |
| 3740678 | 6/1989 | Fed. Rep. of Germany | 264/46.4 |
| 1581773 | 9/1969 | France | 264/255 |
| 4058769 | 5/1979 | Japan . | |
| 7059731 | 4/1982 | Japan . | |
| 150533 | 6/1989 | Japan | 264/257 |
| 0898242 | 6/1962 | United Kingdom . | |

Primary Examiner—Robert A. Dawson
Assistant Examiner—Allan R. Kuhns
Attorney, Agent, or Firm—Darby & Darby

[57] ABSTRACT

A panel having a finish face, a substrate and a lamina of moulded polyurethane between the two is formed in a single closable die having two portions, the first stage of the operation being to spray a release agent onto a face forming surface of one die portion, then spray an aliphatic polyurethane colored film onto the release agent, spray an elastomer polyurethane over that film and allow the elastomer to at least partially set, lay a sheet of reinforcing fibre which can for example be a continuous filament glass over the at least partially set elastomer, dispense the liquid ingredients of a rigid foam polyurethane over the glass, close to the mould, and remove the product after setting.

7 Claims, 4 Drawing Sheets

METHOD OF FORMING A MOULDED PANEL

This invention relates to a method of production of a moulded panel, wherein a rigid substrate supports a finished panel surface, and for example is particularly applicable to, but not limited to, a door inner panel for a motor vehicle.

BACKGROUND OF THE INVENTION

In our U.S. application No. 07/413286 dated 27th Sept., 1989, (corresponding Australian application 41111/89) there was described and illustrated a process for producing a moulded panel with a "luxurious" feel, and in that process a substrate was initially moulded from cross linked polymeric material, the substrate subsequently being placed in a die in which were injected the ingredients for a foam padding material, covered by a flexible finish face film.

Although the method of that invention was economical and easily achieved, the resultant panel was essentially a very high quality panel and embodied some features which added to cost. For example, production of a panel according to that invention has been found to require the use of two eight station rotary indexing tables (carousels).

The main object of this invention is to provide also a high quality panel (but not necessarily of the same luxurious standard as in our earlier invention), but wherein the production can be achieved in a single moulding die of two die portions, thereby providing means whereby high production levels can be achieved with a fewer number of moulds.

BRIEF SUMMARY OF THE INVENTION

Briefly, in this invention, the production of a panel having a finish face, a substrate and a lamina of moulded polyurethane between the two is formed in a single closable die having two portions, the first stage of the operation being to spray an aliphatic polyurethane coloured film onto a release agent of one die portion, and spray an elastomer polyurethane over that film and allow to at least partially set, lay a sheet of reinforcing fibres which can for example be a continuous filament glass fibre over the at least partially set elastomer, dispense the liquid ingredients of a rigid foam polyurethane over the reinforcing fibres, close the mould, and remove the product after setting. Alternative materials such as fabric, carpet, or alternative facing film material may be applied subsequently in lieu of, or as well as, the aliphatic polyurethane, and the lamina of polyurethane elastomer adjacent the facing material may be a dense foam to provide a little "softness" to the otherwise "hard feel".

More specifically, in one aspect the invention consists of a method of production of a moulded panel having a finish face, a substrate, and a lamina of moulded polyurethane between the face and substrate, comprising the following steps sequentially:

(a) applying release agent to finish forming and substrate forming surfaces of respective portions of an open two portion die set, applying a finish material over said release agent on the finish forming surface of one of said portions so as to establish an obverse side and a reverse side of the finish material, (b) applying ingredients of mouldable polyurethane over the reverse side of the finish material, (c) applying a sheet of reinforcing fibres over the mouldable polyurethane after it has at least partially set but before it has completely cured, (d) applying liquid ingredients of a rigid polyurethane to the reinforcing fibres, and closing the die portions so that said substrate forming surface is contiguous with the rigid polyurethane before setting of the rigid polyurethane, and (e) opening said die portions after all said polyurethane has set, and removing the moulded panel from the die set.

With this invention, the entire operation can take place in a relatively short cycle time and a single die can be used for producing a product of high quality, which is generally considered to be higher than the quality presently used in motor vehicle construction.

An improvement in the "soft feel" of the surface can be achieved if the mouldable polyurethane is allowed to "blow" a little before or during the application of the reinforcing fibres and the rigid urethane foam-forming ingredients.

BRIEF SUMMARY OF THE DRAWINGS

Embodiments of the invention are described hereunder in some detail with reference to and are illustrated in the accompanying drawings, in which.

DETAILED DESCRIPTION OF THE INVENTION

Figures 1A, 1B:
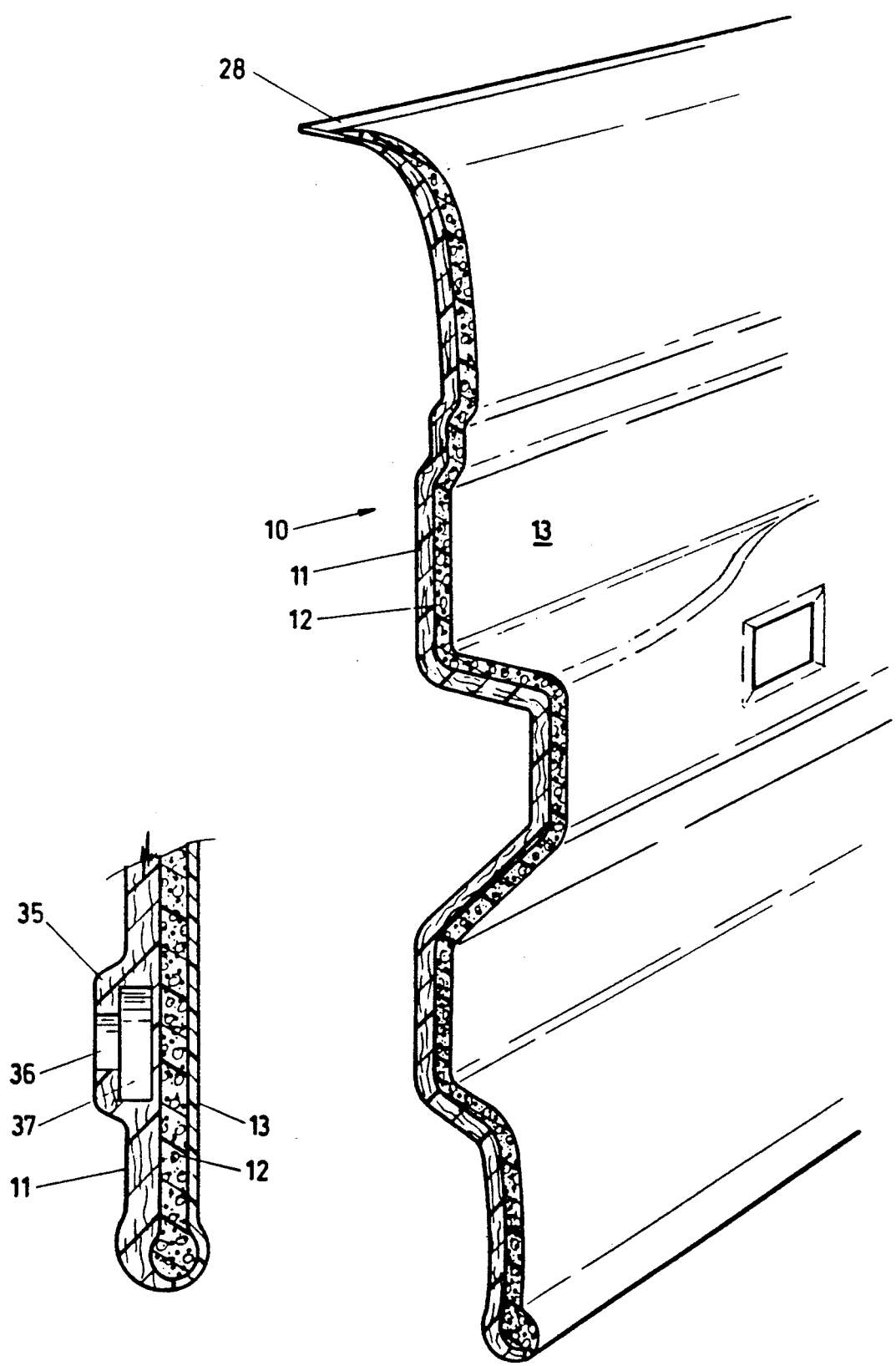
FIG. 1a is a partly sectioned perspective view of a typical motor vehicle door inner panel.
FIG. 1b is a fragmentary section drawn to a much larger scale than FIG. 1a, and showing the sectional shape of a fastener retaining boss.

The first embodiment of the invention is illustrated in FIGS. 1a, 1b, 2 and 3. In this embodiment, a door inner panel 10 for a motor vehicle comprises a substrate 11 having a continuous filament glass reinforcement which is penetrated by a cross-linked rigid polyurethane, and this overlies a partly cellular high density lamina 12 of polyurethane, which is itself adhered to a finish face 13, which in this embodiment is an aliphatic polyurethane colour film which has been sprayed onto a release agent which has been applied to a fixed die portion 14 of a two portion die 15, the second portion being a hinged portion 16 which is hinged to the fixed die portion 14 by means of a plurality of hinges 17.

Figure 3:
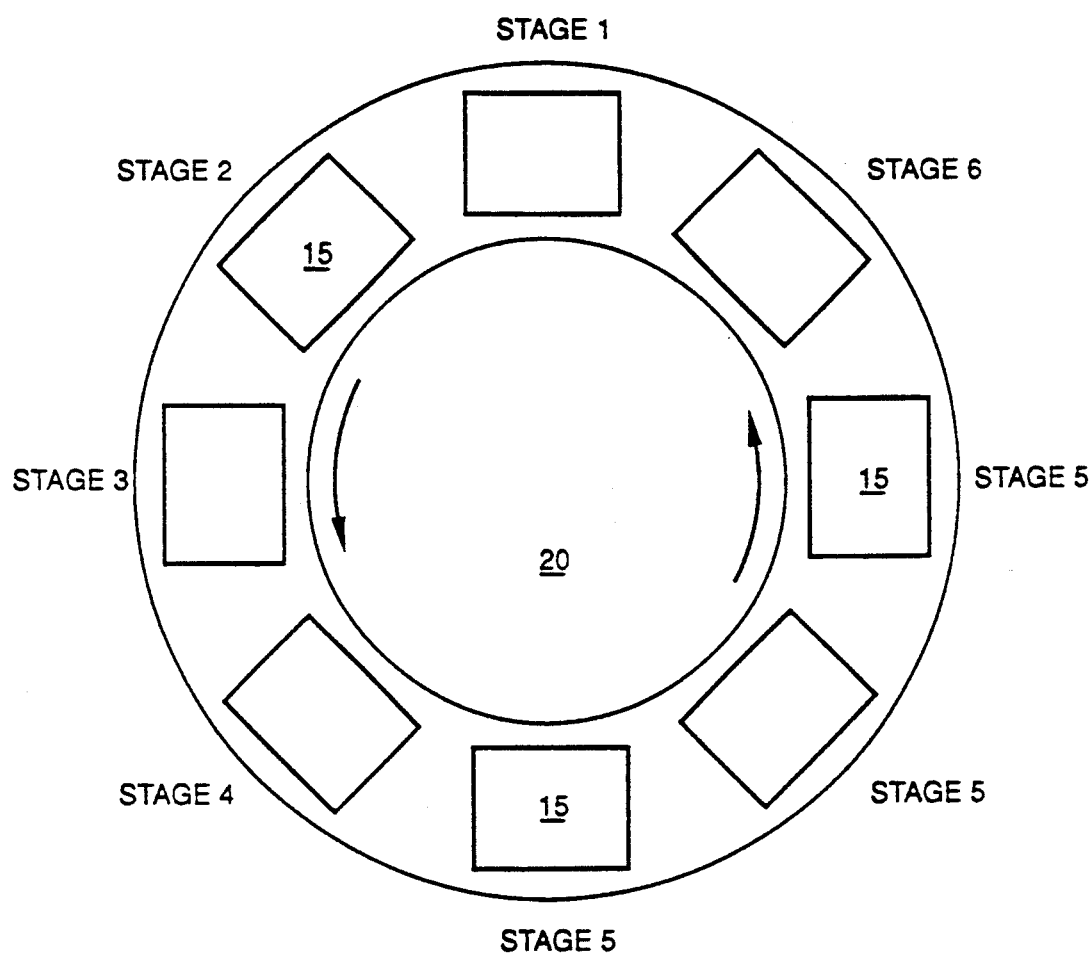
FIG. 3 is a plan view of an eight station rotary indexing table ("carousel") useful in the production of panels moulded in accordance with this invention.

As shown in FIG. 3, a rotary indexing table ("carousel") 20 is provided with eight stations and each station comprises a two portion die 15, and in this embodiment all the dies are identical.

Figure 2:
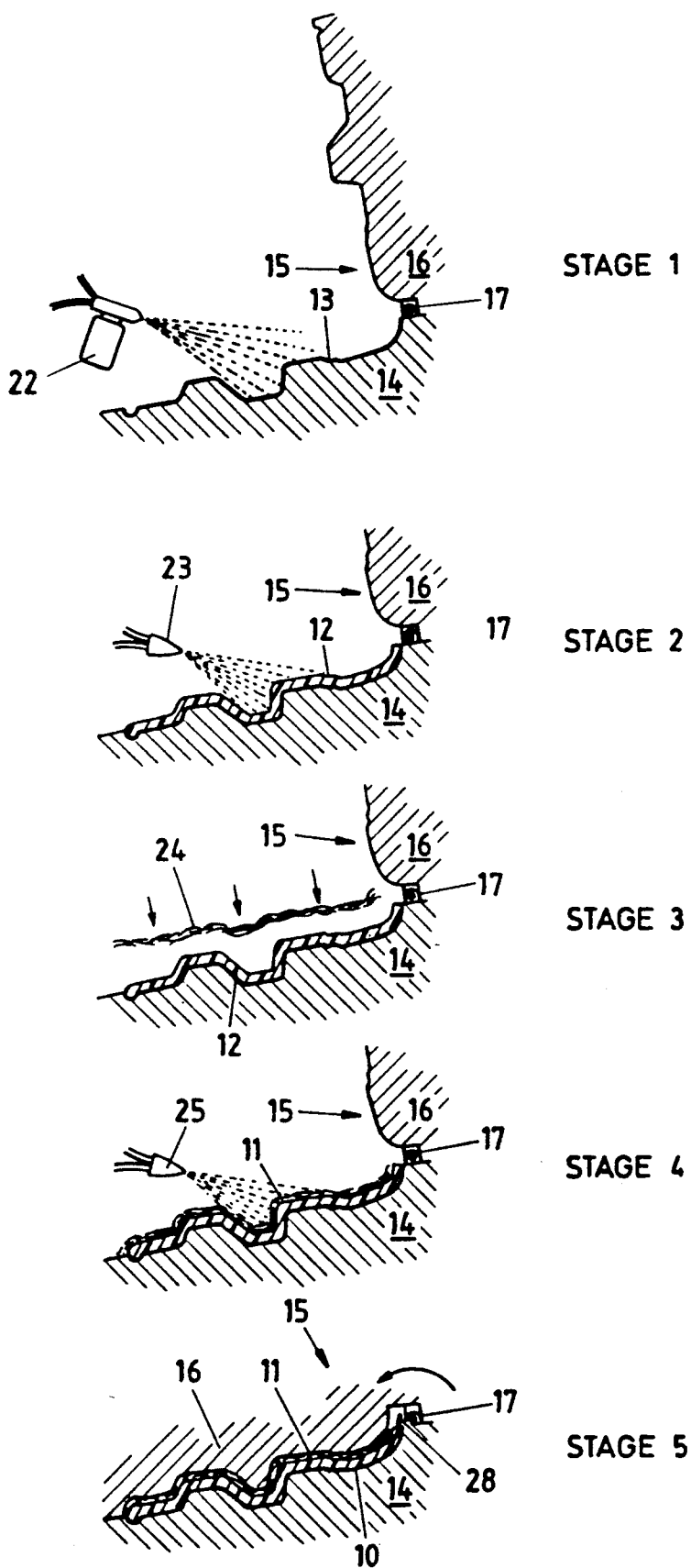
FIG. 2 illustrates diagrammatically five stages in the production of a door inner panel.

The first stage is illustrated in FIG. 2, stage 1, wherein firstly a release agent is applied to both the die portions 14 and 16, and a film 13 of aliphatic polyurethane is applied to the lower portion by means of a spray gun 22 to a thickness of between 0.15 and 0.5 mm, and in most instances between 0.2 and 0.3 mm.

A dense cellular lamina 12 of elastomeric polyurethane is then applied by means of a spray gun 23 which sprays the ingredients of a two pot mix mouldable polyurethane elastomer over the finish face film 13 to adhere to the reverse side thereof, the obverse side staying in contact with the surface of die 14.

The lamina 12 need not necessarily be elastomeric nor cellular but this is preferred, and is allowed to at least commence setting and if cellular, a small amount of blowing to occur before a sheet of fibre glass 24 (having a continuous filament) is placed over the at least partially set elastomeric elastomer 12. The fibre glass 24 functions as a reinforcement, and this is impregnated in stage 4 by a further two pot mix of mouldable polyurethane, applied through a spray gun 25, the polyurethane however not being elastomeric as in stage 2 but being of a material which sets to become rigid after it has embodied the fibres of the glass sheet 24.

In stage 5 which is the final stage of the moulding, a metal strip 28 is inserted at the top edge of the panel to be moulded and the upper die portion 16 is closed down over the lower die portion 14.

These stages are illustrated in FIG. 3 and it will be seen that stage 5 is maintained through three separate stations to give the polyurethane sufficient time to set and harden so that the panel may be withdrawn, and this is effected at stage 6. Quite clearly however, the operations where effected can be effected in other stages, however, only a single eight station carousel is required in the production of panels in the examples herein, compared with two carousels required for the method described and claimed in our aforesaid U.S. specification No. 07/413286.

As seen in FIG. 1a, the substrate 11 can be moulded to have an outstanding boss 35 with an initial small diameter opening 36 formed by a projecting pin on the die portion 16 as it closes. The base of the opening 36 is expanded at 37 by means already known in the art, and in this embodiment, the means comprising a rotary router tool. The boss can then contain a retaining stud which can be in accordance with known art.

Figure 4:
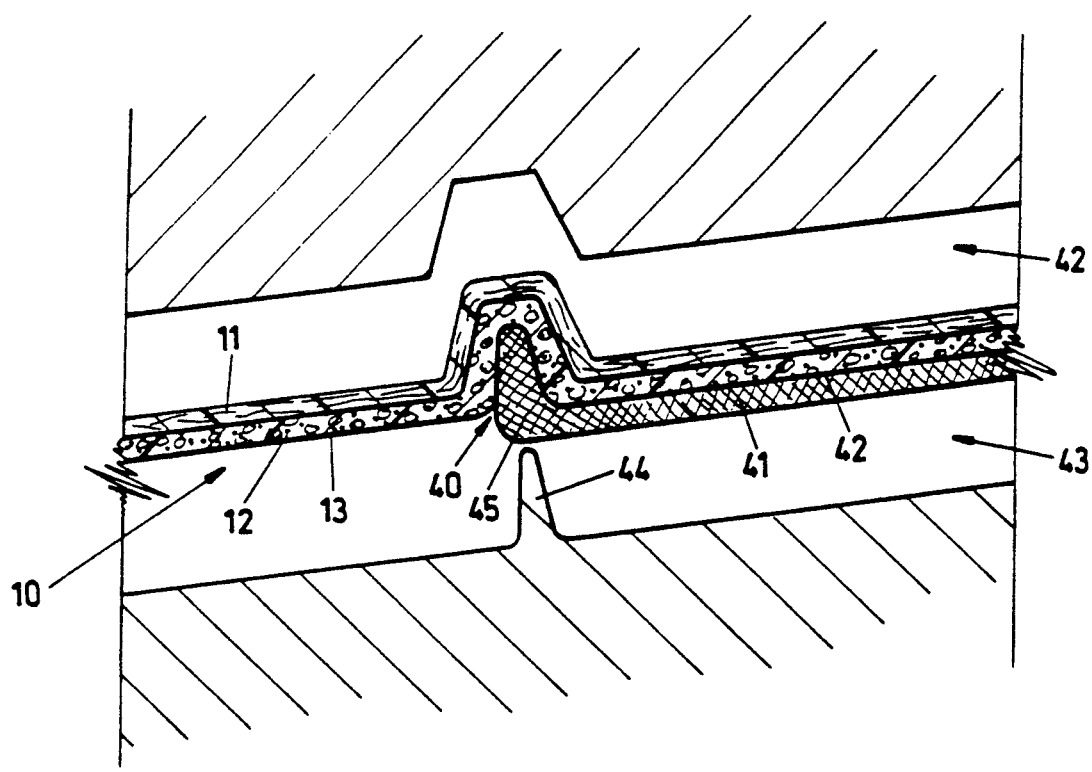
FIG. 4 shows one method of attaching a fabric panel to portion only of the obverse face of a door inner panel, after effecting moulding thereof by the method illustrated in the above drawings.

One of the features of the aforesaid U.S. patent specification No. 07/43286 is that fabric panels can be embodied during the moulding operation. However, difficulties can be encountered if such a process is attempted in the above described embodiment, and in FIG. 4 when the panel 10 is formed it is moulded with a groove 40 in its obverse side of said finish material. A sheet of fabric 41 is cemented at 42 over portion of the face of door panel 10, with its edge overlapping groove 40. A simple low pressure die comprises an upper portion 42 and a lower portion 43, and a blade 44 urges the overlapping edge 45 of the fabric into groove 40, thereby providing a very neat edge.

The aforesaid U.S. patent specification No. 07/413286 contains a detailed description of a method of establishing a map pocket and establishing an armrest when moulding a panel, and that method is also applicable to the invention described in this specification. The said United States specification is corresponding specifications in other countries are therefore incorporated herein but by way of reference only.

The function of the metal strip 28 is to provide an accurately located support means for a belt line within the interior of a motor vehicle body.

The advantages which were achieved in our earlier specification are also achieved in this specification, particularly in that the door panel is dimensionally stable in all service conditions. The surface will not fog or discolour, it has a high impact resistance, styling restrictions are not imposed by the process, yet the panel is strong and rigid.

The claims defining the invention are claimed as follows:

1. A method of production of a moulded panel having a finish face, a substrate, and a lamina of moulded polyurethane between the face and substrate, comprising the following steps sequentially:
   (a) spraying release agent to finish forming and substrate forming surfaces of respective portions of an open two portion die set, applying a finish material over said release agent on the finish forming surface of one of said portions so as to establish an obverse side and a reverse side of the finish material,
   (b) spraying ingredients of mouldable polyurethane over the reverse side of the finish material,
   (c) applying a sheet of reinforcing fibres on the mouldable polyurethane after it has partially set but before it has completely cured,
   (d) spraying liquid ingredients of a rigid polyurethane onto the reinforcing fibres, and closing the die portions so that said substrate forming surface is contiguous with the rigid polyurethane before setting of the rigid polyurethane, and
   (e) opening said die portions after all said polyurethane has set, and removing the moulded panel from the die set.

2. A method according to claim 1 wherein said finish material comprises an aliphatic polyurethane colour film, and the method comprises spraying release agent also on said finish forming surface, and spraying liquid ingredients of said aliphatic polyurethane colour film on said release agent on the finish forming surface.

3. A method according to claim 1 wherein said polyurethane ingredients applied in step (b) of claim 1 set to at least partly cellular high density foam elastomer.

4. A method according to claim 1 further comprising moulding said panel with a boss outstanding from said substrate, to have a small diameter opening in said boss, and, after said removal of the panel, expanding the base of said opening by a rotary tool.

5. A method according to claim 2 wherein said polyurethane ingredients applied in step (b) of claim 1 set to at least partly cellular high density foam elastomer.

6. A method of production of a molded panel having a finish face, a substrate, and a lamina of molded polyurethane between the face and substrate, comprising the following steps sequentially:
   (a) applying release agent to finish forming and substrate forming surfaces of respective portions of an open two portion die set, applying a finish material over said release agent on the finish forming surface of one of said portions so as to establish an obverse side and a reverse side of the finish material,
   (b) applying ingredients of mouldable polyurethane over the reverse side of the finish material,
   (c) applying a sheet of reinforcing fibers over the mouldable polyurethane after it has at least partially set, but before it has completely cured,
   (d) applying liquid ingredients of a rigid polyurethane to the reinforcing fibers, and closing the die portions so that said substrate forming surface is contiguous with the rigid polyurethane before setting of the rigid polyurethane, (e) opening said die portions after all said polyurethane has set, and removing the molded panel from the die set; and (f) said steps further comprising molding said panel to have surfaces defining a groove extending along a portion of the panel extending inwardly from said obverse side, cementing a sheet of fabric over a portion only of said obverse side, with an edge overlapping said groove, and urging said overlapping edge into said groove.

7. A method according to claim 6 further comprising positioning said panel together with said fabric sheet in one portion of a two portion die wherein the other portion comprises a blade aligned with the groove, and closing the die to thereby effect said urging of the overlapping edge into the groove with said blade.

* * * * *